United States Patent
Feldmeier

(10) Patent No.: US 7,188,531 B1
(45) Date of Patent: Mar. 13, 2007

(54) PRESSURE GAUGE FOR USE WITH SANITARY CONDUIT

(76) Inventor: Robert H. Feldmeier, 7632 Hunt La., Fayetteville, NY (US) 13066

( * ) Notice: Subject to any disclaimer, the term of this patent is extended or adjusted under 35 U.S.C. 154(b) by 0 days.

(21) Appl. No.: 11/230,381

(22) Filed: Sep. 20, 2005

(51) Int. Cl.
*G01L 7/16* (2006.01)
(52) U.S. Cl. ..................... 73/744; 73/861.49
(58) Field of Classification Search .......... 73/700–756, 73/861.46–861.57
See application file for complete search history.

(56) References Cited

U.S. PATENT DOCUMENTS

| | | | |
|---|---|---|---|
| 4,380,166 A | 4/1983 | Crombie | 73/4 R |
| 4,715,230 A * | 12/1987 | Tatsuzawa | 73/706 |
| 4,754,648 A * | 7/1988 | Byrd et al. | 73/744 |
| 4,790,821 A * | 12/1988 | Stines | 604/97.03 |
| 4,862,754 A * | 9/1989 | Nimberger | 73/864.62 |
| 4,930,361 A * | 6/1990 | Nimberger | 73/864.62 |
| 5,259,235 A * | 11/1993 | Kolb | 73/1.65 |
| 6,207,112 B1 * | 3/2001 | Spallek et al. | 422/100 |
| 2004/0200289 A1 | 10/2004 | Sherman et al. | 73/756 |

OTHER PUBLICATIONS

Anderson Instrument Co., Fultonville NY; Anderson Sanitary Pressure Gauges sales brochure. (2005).
Anderson Instrument Co., Fultonville NY; Digital Pressure Gauge & Switch sales brochure. (2005).

* cited by examiner

*Primary Examiner*—Edward Lefkowitz
*Assistant Examiner*—Jermaine Jenkins
(74) *Attorney, Agent, or Firm*—Bernhard P. Molldrem, Jr.

(57) ABSTRACT

A standard industrial pressure gauge is adapted for a sanitary conduit that has been provided with a tubular stub for mounting the gauge. A cylinder has a disk flange that mates with an upper flange of the tubular stub. A cap closes off the top of the cylinder, and a female threaded nipple is affixed on the cap over an aperture through the cap. A piston has one or a pair of O-ring seals seated on the circumferential surface of the piston, with the piston having at least a limited range of motion within the cylinder. The gauge is fitted into the threads of the nipple, and the space above the piston and through the aperture and the nipple is filled with an incompressible fluid. In one embodiment, there is a leak detector hole in the cylinder wall aligned with the space between the two O-rings.

6 Claims, 3 Drawing Sheets

PRESSURE GAUGE FOR USE WITH SANITARY CONDUIT

BACKGROUND OF THE INVENTION

This invention relates to monitoring equipment for processing of liquids used in products for human consumption, e.g., dairy products such as milk, cream, and ice cream mix, other liquid food products, e.g., fruit juices and soups, or pharmaceuticals. The invention is more particularly concerned with an adapter and a technique for employing a standard pressure gauge on sanitary conduits in which such liquid products are processed, and which permits the pressure gauge to be changed out or replaced when necessary, without incurring high material or labor costs and while maintaining sanitary conditions within the conduit.

Pasteurization is a process for heat treating milk or other food or ingestible product in order to kill pathogens such as bacteria or other microorganisms. The U.S. Public Health Service has published standards for equipment for the pasteurization of milk and other milk products, and there are similar regulations concerning equipment for processing other products. By law, the milk or other product has to be heated to certain temperatures and held at a particular temperature. The pressures and pressure differentials of the product have to be closely monitored at certain points in the process. This means that working pressure gauges have to be present in the conduit, and must be replaced whenever they fail. On the other hand, in order to ensure that the sanitary conduit can be cleansed and sanitized between processes, the conduit is designed so that it can be completely cleaned of any milk or other product by washing it and rinsing it with a cleaning fluid that must reach every point on the interior of the conduit. No threaded connectors can be used anywhere that the liquid product flows, because of the difficulty in cleaning the threads.

Standard pressure gauges typically have a threaded stem that is used for securing the gauge into a threaded nipple in the associated equipment. However, there can not legally be any threaded connections at any point at which the product would come into contact with the threads. Because these standard gauges rely on threaded connections to install them and hold them in place, an alternative technique has been employed for using pressure gauges and the like in sanitary conduits.

One technique that has been employed previously has been to install a diaphragm and flange disk onto the pressure gauge, and then to clamp the disk and diaphragm in place on top of an annular flange portion of a stub member that is affixed onto the conduit. A sanitary clamp, e.g., a so-called tri-clamp, compresses a sealing gland or ring between these two flanges, so there are no threads exposed to the product in the sanitary conduit. Unfortunately, these specially constructed gauges are many times more costly than the standard pressure gauges, and thus much more expensive to replace.

In addition, the standard pressure gauge and the diaphragm type gauge mentioned above do not have any means for disclosing a leak or a failure of a seal within the gauge assembly.

In a regenerative heat exchanger of the type that is used in many pasteurizers, critical temperature differences have to be maintained between the raw product side and the pasteurized product side (typically, only a few degrees). To achieve this, flow rates must be kept within narrow limits, which requires critical pressure differentials. For efficient operation it is important to monitor pressure there very closely. It is also desirable to be able to replace a gauge quickly when it fails, and to employ standard gauges of relatively low cost, yet still of acceptable accuracy.

OBJECTS AND SUMMARY OF THE INVENTION

It is an object of the present invention to provide a pressure gauge arrangement that can be easily installed for use in conduits for liquid food products, and which avoids the drawbacks of the prior art.

It is another object to provide an adapter that permits installation of a standard type of pressure gauge on a sanitary conduit, while avoiding any threaded connectors being in contact with the liquid product.

It is a further object to provide an arrangement that is straightforward in construction, and which facilitates installation and change-out of the pressure gauge.

According to one aspect of the invention, a pressure gauge adapter is provided for use in connection with a sanitary conduit, e.g., a product—product heat exchanger of a pasteurizer, through which a liquid product, e.g., milk, flows. The pressure of the product is to be monitored as the product flows through the conduit. At pressure measuring points along the conduit there are tubular stubs for mounting pressure gauges. Each of these tubular stubs permits communication of pressure to the gauge from said fluid. The pressure gauge is a standard type of gauge with a body portion and a male threaded stem for attaching to a female-threaded gauge fitting on the adapter.

In any of various preferred embodiments, the adapter has a flange member of a diameter to mate with an upper flange of the tubular stub. A seal gland or equivalent seal means is disposed between the flange member and the flange of said tubular stub. A tri-clamp or equivalent sanitary clamp means holds the flange member in sealed engagement with the tubular stub. The tri-clamp allows the adapter to be removed for maintenance. A cylinder rises from the flange member, and has a hollow cylindrical wall and a cap closing off its upper end. The cylinder has an aperture or opening through the cap. A female threaded nipple is welded or otherwise affixed onto said cap over said aperture. The nipple having a female thread adapted to accept the male threaded stem of said pressure gauge, whereby the nipple serves as the aforesaid gauge fitting.

A piston is fitted within the cylinder, with a seal ring that sealably engages the hollow cylindrical wall. The piston enjoys sliding motion in the cylinder over some limited range of axial motion. The void defined by the cylinder above the piston, the aperture, and the nipple up to the gauge, is filled with a non-compressible pressure transmitting medium. This can be a liquid, e.g., water, glycol, or another fluid of the type that is commonly used for such purposes. As aforementioned, the standard pressure gauge has a body portion, which may contain a dial face, needle, lens, etc. A male threaded stem (typically ¼ inch diameter) protrudes from the body portion. Typically, there is an opening in this stem that permits communication of pressure of the non-compressible medium with a pressure sensing mechanism within the gauge.

In one preferred embodiment, there are an upper seal ring and a lower seal ring on the piston, and these are seated in parallel spaced relation to one another, so that the two seal rings define an annular space between them. So long as the seals hold, this space will be free of the pressure transmitting medium and free of any of the liquid product. However, in the event of a seal failure, one or the other fluid may enter this annular region. There is a small opening, i.e., leak-detection hole, through the cylindrical side wall of the cylinder, at a place aligned with the annular space on the piston. This will ensure that any product or pressure transmitting fluid that leaks past the O-ring seal or seals will become visibly evident.

Preferably, the flange at the base of the cylinder has a radially tapered outer edge adapted to receive a standard sanitary tri-clamp. The pressure gauge may be of any standard design, and may employ a mechanical or aneroid sensor mechanism, a load cell detector mechanism, or any other system, which may be of conventional design. The gauge may employ either a standard needle dial or a digital display, or may provide an electrical output for remote monitoring. In other embodiments, the flange need not have a strictly circular profile, so long as it is capable of mating with the upper flange of the associated tubular stub.

The processing equipment associated with this invention may be used for whole milk, skim milk, cream, or other dairy products such as flavored milk or ice cream mix. The arrangements of this invention may also be used for processing orange juice, grapefruit juice, apple juice, or other fruit juices. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements and techniques of the present invention will become apparent from the ensuing detailed description of a preferred embodiment of the invention, when considered in connection with the accompanying Drawing.

DETAILED DESCRIPTION OF THE PREFERRED EMBODIMENT

The pressure gauge and adapter of the present invention can be employed in connection with a pasteurization process such as that described in my copending U.S. patent application Ser. No. 10/717,875, Nov. 20, 2003, which is incorporated herein by reference.

Figure 1:
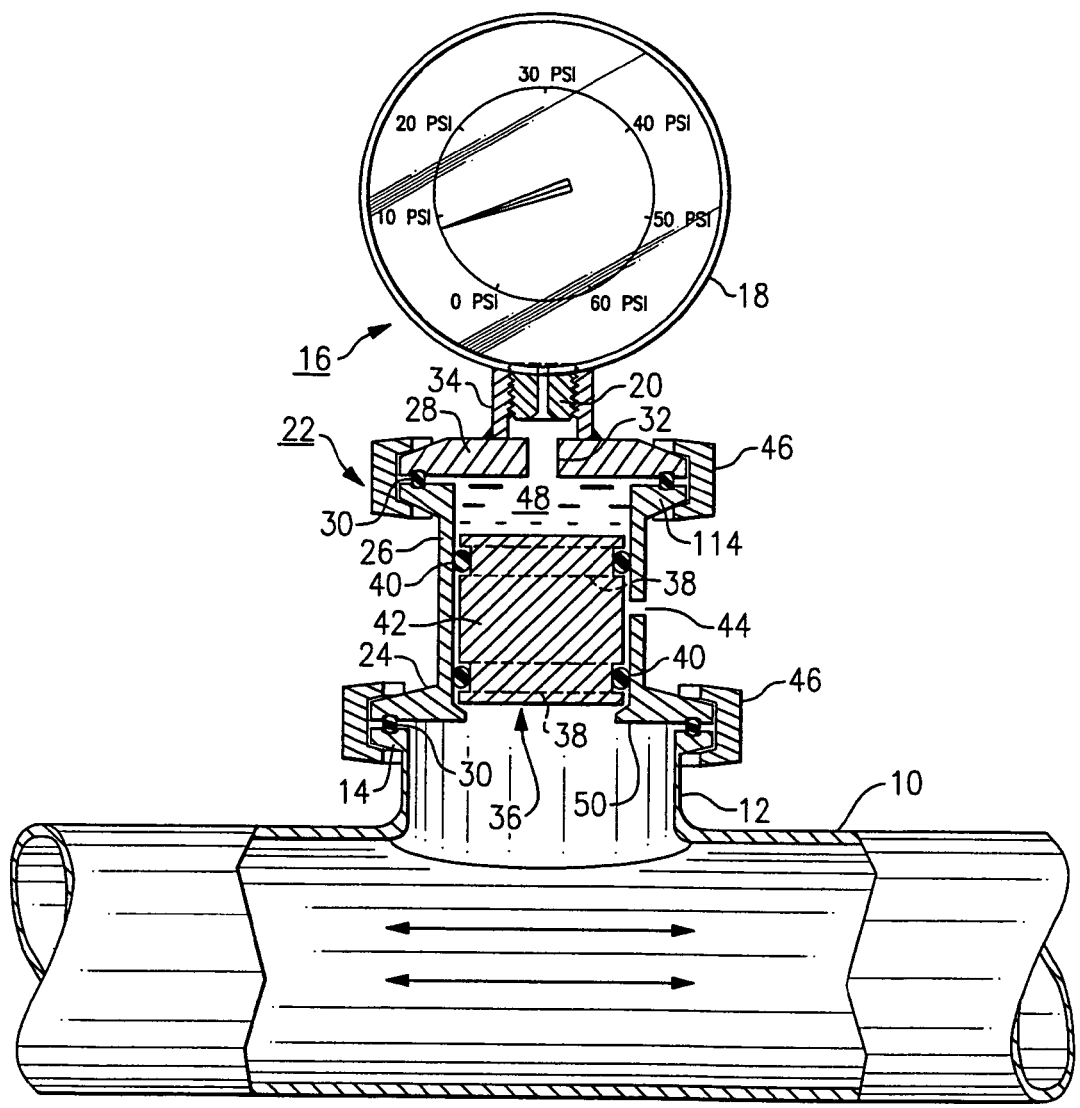
FIG. 1 is an adapter according to one embodiment of the invention.

With initial reference to FIG. 1, the invention may be employed on a tubular sanitary conduit 10, which may be of the type that processes a dairy product, such as milk or ice cream mix, another edible product such as fruit juice, sauce or soup, or a pharmaceutical product for human or veterinary use. In this case, a tubular stub 12 rises from one side of the conduit 10, and provides a location for installing a gauge. The stub 12 has a ring flange 14 at its upper end. The ring flange 14 has a flat upper surface and a tapered lower surface.

An industrial pressure gauge 16 here represents any of a large variety of suitable gauges, of various types and having a variety of pressure ranges, depending on the application. In this example, the gauge 16 has a body portion 18 that is disposed outside the conduit 10. There, the body portion 18 is of a generally cylindrical or disk shape, with a dial, indicator needle, face with temperature gradations, and a cover glass or lens. Alternatively, the gauge could have a digital display or could simply have conductors emerging to lead away toward a temperature display on a control panel or console. As is standard in these gauges, a stem 20 having male threads emerges from the body portion 18.

Atop the tubular stub 12 is situated a cylinder 22 with a flange ring 24 facing the ring flange 14, and with a cylindrical wall 26 that extends upwards from the flange ring 24. A cap 28 closes off the top of the cylinder. Here the cap 28 is held by means of a sanitary clamp or tri-clamp 46 onto a ring flange 114 formed on the top of the cylindrical wall 26. Sealing glands 30, 30 are situated between the facing surfaces of the ring flange 14 and the flange ring 24, and between the ring flange 114 and a peripheral portion of the cap 28. Alternatively, in some embodiments the cap may be welded onto the top edge of the cylindrical wall 26. There is an opening or aperture 32 through the center of the cap 28, and an internally threaded, i.e., female threaded pipe coupling or nipple 34 that rises from the cap 28 surrounding the opening 32. This receives the male threaded stem 20 of the gauge, and serves as the receptacle for mounting the gauge. In this embodiment, the gauge 16 is a standard type of industrial pressure gauge, and has an opening through the stem 20 that permits fluid communication of pressure with the sensor mechanism within the body portion 18.

A disk-shaped piston 36 within the cylinder 22 has a free range of up-and-down motion, within a limited range. The piston has a pair of axially separated annular seats 38, which hold upper and lower O-ring seals 40, 40, respectively. These seals 40 contact the inner cylindrical wall of the cylinder 22 and prevent contact of the liquid product in the conduit 10 with anything beyond the piston 36. The piston 36 may be stainless steel or may be a food grade or medical grade plastic, e.g., high density high molecular weight PTFE.

The two O-ring seals 40, 40 define between them an annular space 42, and a leak detector hole or aperture 44 is formed through the cylindrical wall 26 at a position centered on the annular space 42, when the piston 36 is at a normal position.

A space 48 is defined above the top of piston 36, through the opening 32, and within the interior of the nipple 34. This space is filled with a liquid, i.e., water, glycol, or other suitable non-compressible fluid. The fluid serves to transmit the pressure in the conduit 10, received through the piston 36, to the gauge 16. The cap 28 may be removed when needed to pour water or another fluid into the space 48 above the piston 36.

An inwardly projecting lip 50 may be formed in the cylindrical wall 26 below the piston 36 to serve as a stop that prevents the piston from being drawn into the conduit 10 in the event of a sudden vacuum formation. Alternatively, one or more projections may be used for this purpose.

The leak detector hole 44 will serve as an outlet for any fluid that may leak past one or the other of the two O-ring seals 40, and provide a visible indication of seal failure. Normally, the seals 40, 40 will keep the annular space 32 dry and free of any fluid. However, if either the edible food product or the pressure transmitting fluid does leak past the respective O-ring seal, noticeable droplets will form at the leak detector hole 44.

Also shown here schematically, a tri-clamp or similar clamping device 46 is employed to secure the ring flanges 14, 24.

Figure 2:
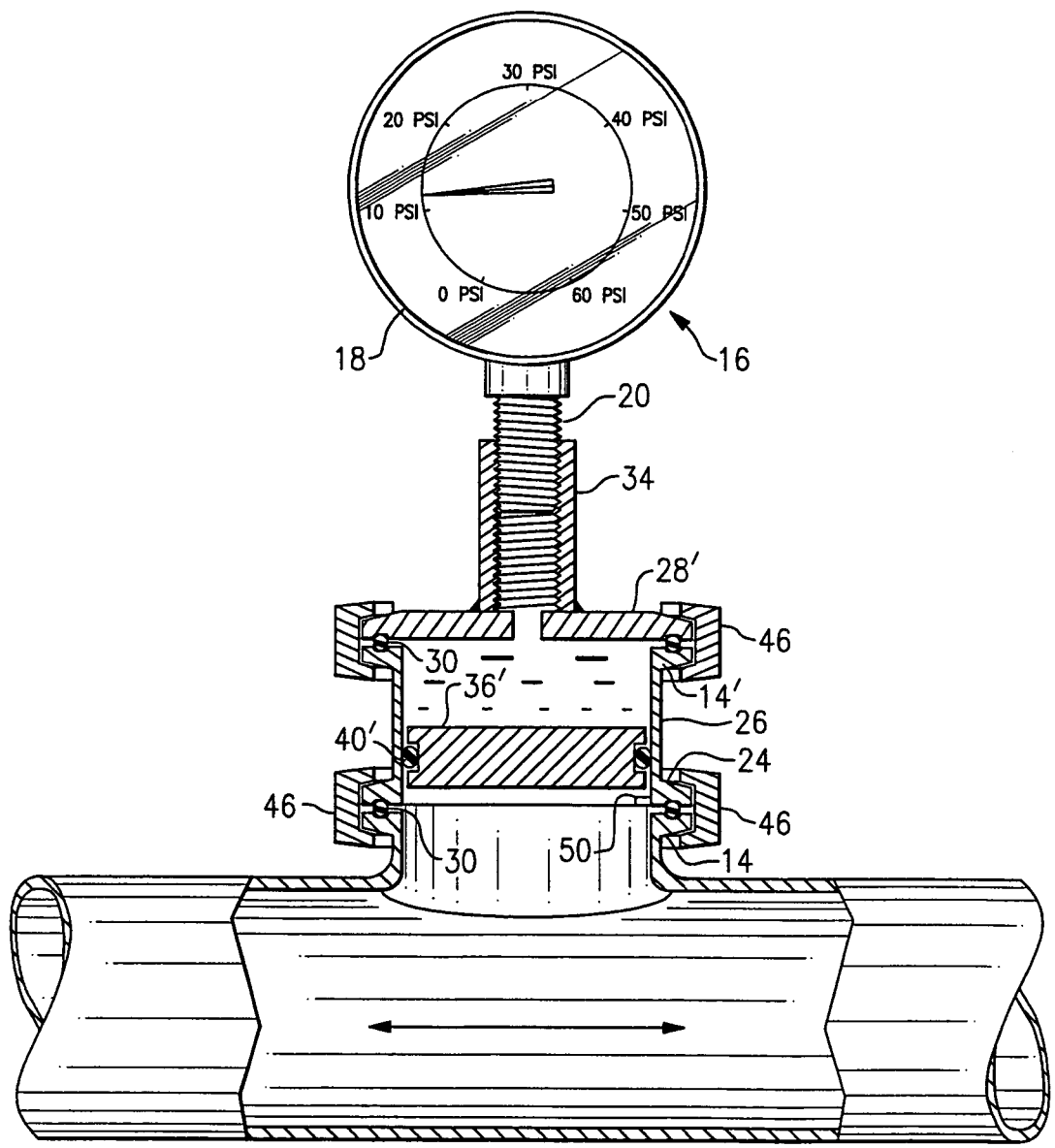
FIG. 2 is an adapter according to another embodiment of the invention.

An alternative embodiment of the invention is illustrated in FIG. 2, in which similar elements are identified with the same reference numbers. In most cases, a repeat of the discussion of those elements is omitted. Changed elements are identified with similar reference numbers, but primed.

In the arrangement of this embodiment, the cap 28' of the cylinder 22' is not welded on, but rather is held down by means of a tri-clamp 46. A flange ring 14' formed on the upper edge of the cylindrical wall 26' The cap 28' is clamped to this upper flange ring 14" with an additional tri-clamp 46, and a seal is formed by means of an annular sealing gland 30. This construction allows the arrangement to be built up by first installing the cylinder 22' onto the tubular stub 12 and then inserting the piston 36'.

In this embodiment, the piston 36' is provided with only a single O-ring seal 40'. There is no leak detector hole provided in the cylindrical wall 26'.

As with the first embodiment, the space above the piston and leading to the gauge is filled with a non-compressible pressure transmitting fluid, which may be water, food-grade glycol, or another liquid.

Figure 3:
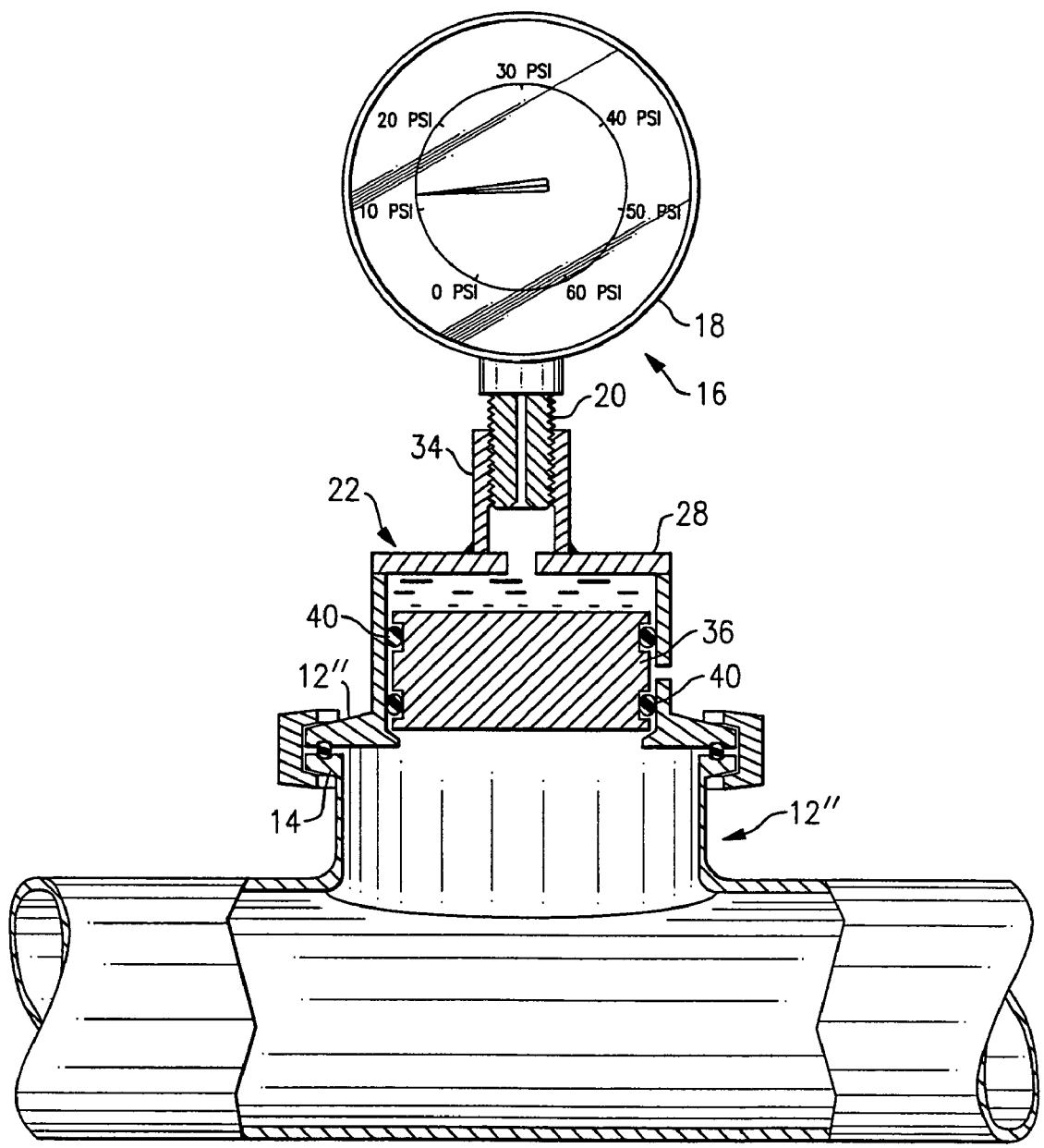
FIG. 3 shows a portion of a variation of one embodiment.

FIG. 3 illustrates a variation on the first embodiment, in which a larger flange 24" is employed at the base of the cylinder 22. This allows the cylinder and the pressure gauge to be installed on a larger size of conduit with a larger diameter tubular stub 12". With this arrangement, the same size piston 36, here with a nominal two-inch diameter, can be used for pressure gauges on two-inch, three-inch, four-inch or larger conduit, so that only one size of piston 36 needs to be kept in stock, and only one size of the associated O-ring seals 40. A single size piston reduces the cost of replacement, as only one size needs to be kept in inventory.

While the invention has been described with reference to a selected embodiment, it should be recognized that the invention is not limited to that precise embodiment. Rather, many modifications and variations will be apparent to persons skilled in the art without departing from the scope and spirit of this invention, as defined in the appended claims.

I claim:

1. Pressure gauge adapter for use in connection with a sanitary conduit through which a liquid product flows whose pressure is to be monitored, the conduit including a tubular stub formed on said conduit to mount a pressure gauge and to permit communication of pressure to said gauge from said fluid; and wherein said pressure gauge has a body portion and a male threaded stem for attaching to a female-threaded gauge fitting; the adapter comprising:

a flange member of a diameter to mate with an upper flange of said tubular stub;

seal means disposed between said flange member and the flange of said tubular stub;

clamp means for removably holding said flange member in sealed engagement with said tubular stub;

a cylinder having a hollow cylindrical wall rising from said flange member and a cap closing off an upper end thereof, including an aperture through said cap;

a female threaded nipple affixed on said cap over said aperture, the nipple having a female thread adapted to accept the male threaded stem of said pressure gauge, such that the nipple serves as said gauge fitting;

a piston fitted within said cylinder including a seal ring for sealably engaging said hollow cylindrical wall but permitting limited axial motion of the piston; and a fill of a non-compressible pressure transmitting medium within said cylinder above said piston, and within said nipple;

wherein said piston has an upper seal ring and a lower seal ring seated in parallel spaced relation to one another defining an annular space therebetween; and wherein said cylinder has an aperture through said cylindrical wall at a position aligned with the annular space of said piston, for providing a visual indication of leakage in the case of failure of either of said upper ring or said lower seal ring.

2. The pressure gauge adapter of claim 1 wherein said flange member includes a disk flange having a radially tapered outer edge adapted to receive a sanitary clamp.

3. The pressure gauge adapter of claim 1 wherein said threaded stem has a diameter of about ¼ inch, and said female threaded nipple has a matching inside diameter.

4. The pressure gauge adapter of claim 1 wherein said piston is formed of a high molecular weight PTFE.

5. The pressure gauge adapter of claim 1 wherein said piston is formed of a food grade stainless steel.

6. The pressure gauge adapter of claim 1 wherein the cylindrical wall of said cylinder is of a smaller diameter than the diameter of the tube stub.

\* \* \* \* \*